(12) United States Patent
Guering

(10) Patent No.: US 7,699,264 B2
(45) Date of Patent: Apr. 20, 2010

(54) REST UNIT FOR AN AIRCRAFT

(75) Inventor: Bernard Guering, Montrabe (FR)

(73) Assignee: Airbus France, Toulouse (FR)

( * ) Notice: Subject to any disclaimer, the term of this patent is extended or adjusted under 35 U.S.C. 154(b) by 151 days.

(21) Appl. No.: 11/776,568

(22) Filed: Jul. 12, 2007

(65) Prior Publication Data

US 2008/0011901 A1 Jan. 17, 2008

(30) Foreign Application Priority Data

Jul. 12, 2006 (FR) .................................. 06 06346

(51) Int. Cl.
*B64D 13/00* (2006.01)

(52) U.S. Cl. ................. 244/118.6; 244/118.5; 105/315; 105/316

(58) Field of Classification Search .............. 244/118.1, 244/118.5, 118.6; 105/344, 345, 397, 314, 105/315, 316; 114/65 R, 192, 193, 188, 114/189, 71; 52/64, 71, 69
See application file for complete search history.

(56) References Cited

U.S. PATENT DOCUMENTS

| 2,901,204 A | 8/1959 | Davis |
| 4,071,210 A | 1/1978 | Mutke |
| 4,589,612 A | 5/1986 | Halim |
| 4,594,817 A | 6/1986 | McLaren et al. |
| 5,784,836 A | 7/1998 | Ehrick |
| 2006/0054741 A1* | 3/2006 | Mills et al. ............... 244/118.5 |
| 2006/0254741 A1 | 11/2006 | Huang et al. |

FOREIGN PATENT DOCUMENTS

| DE | 2 630 210 | 1/1978 |
| EP | 0 901 963 | 3/1999 |

OTHER PUBLICATIONS

U.S. Appl. No. 12/336,988, filed Dec. 17, 2008, Guering, et al.
U.S. Appl. No. 12/373,055, filed Jan. 9, 2009, Guering.

* cited by examiner

*Primary Examiner*—Christopher P Ellis
(74) *Attorney, Agent, or Firm*—Oblon, Spivak, McClelland, Maier & Neustadt, L.L.P.

(57) ABSTRACT

A rest unit that can be laid out inside a fuselage of an aircraft, especially for the benefit of the crew, is made up of a plurality of cells of an elongated shape, each cell having longitudinal and transverse dimensions corresponding to a location of a berth, the cells being juxtaposed on at least two levels to form a module of a parallelepipedal outer shape. This module can be incorporated in a rear cone of the fuselage of the aircraft.

8 Claims, 2 Drawing Sheets

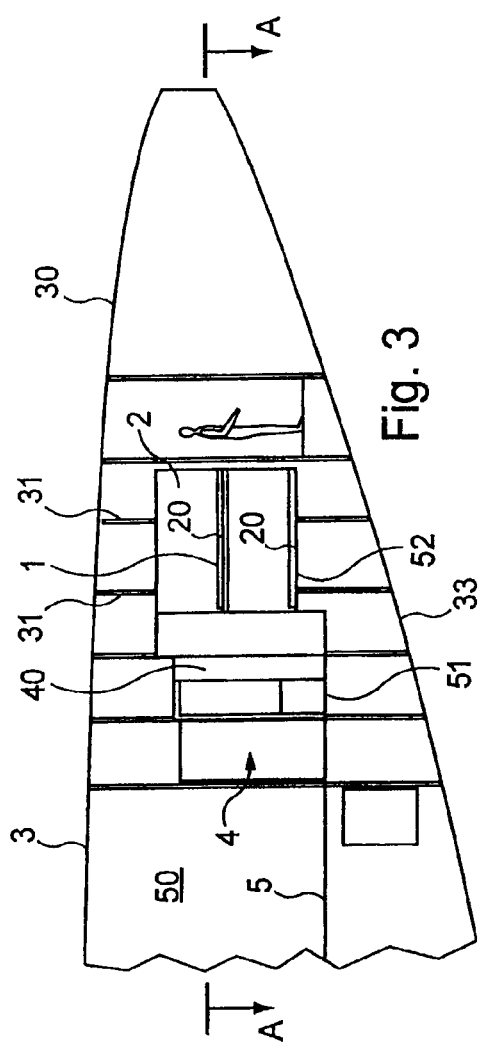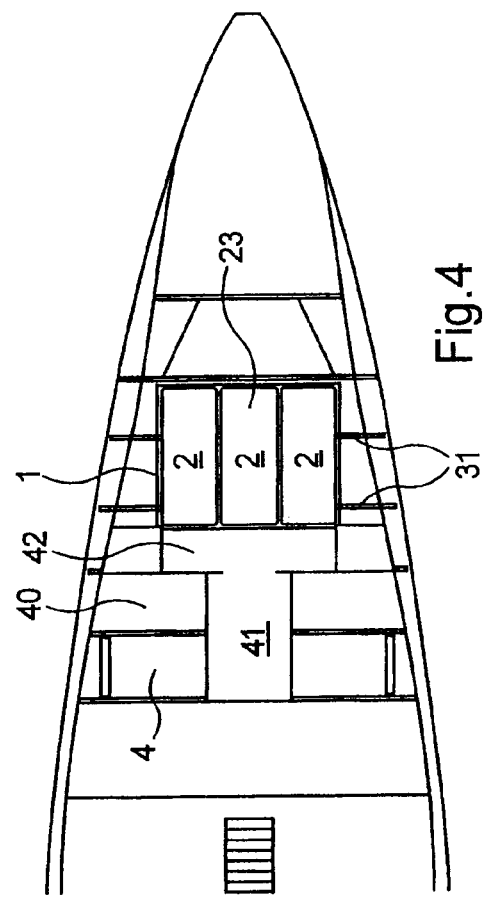

REST UNIT FOR AN AIRCRAFT

BACKGROUND OF THE INVENTION

Field of the Invention

The invention has as its purpose a rest area intended to be laid out in particular inside an aircraft fuselage, especially for the benefit of the crew.

BRIEF SUMMARY OF THE INVENTION

An aircraft for the transport of passengers comprises, inside a fuselage, a cockpit and a passenger cabin laid out in a pressurized and air-conditioned zone, above a floor forming a main deck, the lower portion of the fuselage, pressurized but generally not air-conditioned, constituting a hold for baggage and other transported loads.

Because of the steady growth in air traffic, there is a tendency to produce large-capacity aircraft, especially for long distances, which requires a large crew and areas laid out for on-board service.

In addition, it also is necessary to provide inside the aircraft a zone reserved for the crew, comprising service areas, storage units and at least one rest lounge.

Furthermore, it appears that it also would be useful to install a certain number of berths for the crew.

Given that the space available inside the aircraft is limited, it generally is provided to locate the rest area for the crew in a zone that cannot be utilized commercially, for example below the main deck. Such a rest area can have only rather small dimensions, especially in height. Moreover, it is not very accessible. By virtue of its position in the hold, it also limits the volume of freight that can be loaded into the aircraft.

The invention makes it possible to resolve such problems thanks to a judiciously laid-out rest unit, constituting a standardized module adaptable to different types of aircraft and the position of which can vary inside the fuselage depending on the internal configuration of the aircraft.

According to the invention, such a rest unit is made up of a plurality of cells of elongated shape, each having longitudinal or transverse dimensions corresponding to the location of a berth, the said cells being superposed on at least two levels so as to form a module of a more or less parallelepipedal outer shape, each of the cells being accessible via a transverse face of the parallelepipedal module.

In particularly advantageous manner, this module comprises a separation wall between two superposed cells that can be folded away so as to form an aisle, each of the two cells separated by the folding wall having an access opening at each of its ends at a transverse face of the parallelepipedal module. In this way the module can be arranged in a passageway used only on the ground for maintenance of the aircraft. In flight, the corresponding berths can be used and they are folded away during the aircraft maintenance phases, thus allowing access to technical zones. It is understood, of course, that other places in the aircraft can be selected.

In accordance with a variation of embodiment, a rest unit according to the invention comprises, for example, six cells arranged on two levels. In this variation, when a folding separation wall is provided, this folding wall preferably separates the median superposed cells so as to form a central aisle.

According to another advantageous characteristic, such a module can be prefabricated in the factory in a single piece with parallelepipedal shape that can be inserted into housings with a rectangular conjugate section laid out in at least two successive frames of the structure of the fuselage.

In a preferred embodiment, this module is incorporated in the rear cone of the fuselage.

In this way such a module can form a rear portion of a space reserved for the crew, comprising a front portion that communicates with the passenger cabin and forms a service area.

The invention also relates to a rear aircraft cone and an aircraft characterized in that they comprise a rest unit such as described above.

Other advantageous characteristics will become apparent in the following description of an embodiment presented by way of non-limitative example and illustrated on the attached drawings.

BRIEF DESCRIPTION OF THE DRAWINGS

FIG. 3 is a partial view in longitudinal section, showing the setting up of a module according to the invention in the rear portion of the fuselage of an aircraft, FIG. 4 is a sectional view according to line A-A of FIG. 3.

DETAILED DESCRIPTION OF THE INVENTION

Figure 1:
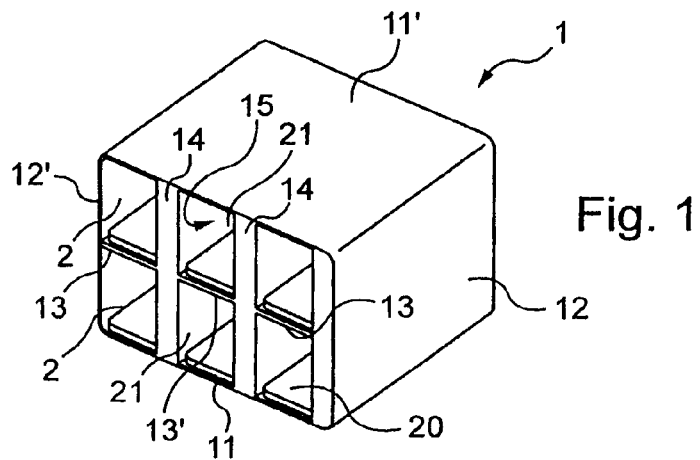
FIG. 1 shows, schematically and in perspective, a rest unit according to the invention.

On FIG. 1 there has been illustrated, in perspective, a rest unit according to the invention made up of a module 1 of parallelepipedal shape having two horizontal faces 11, 11' and two lateral faces 12, 12', and separated by horizontal partitions 13 and vertical partitions 14, into six cells 2 juxtaposed and superposed on two levels.

The longitudinal and transverse dimensions of the module 1 are determined so that each cell 2 has a length L, a width I and a height h defining a space sufficient to install a berth 20 comfortably therein.

As FIG. 1 shows, the cells 2 lead to a transverse face 15 of the module 1 in order to permit an individual access to each berth 20.

The horizontal partition 13' separating the central cells 21, 21' of the module 1, however, can be mounted pivoting on one of the vertical partitions 14, so as to be able to fold away, downward or upward, in this way freeing up a central aisle 23 in the module 1, making it possible to move through the module 1 (FIG. 4). When the module 1 is arranged in an aircraft fuselage, the central aisle 23 can be used for accessing a following portion of the fuselage.

Figure 2:
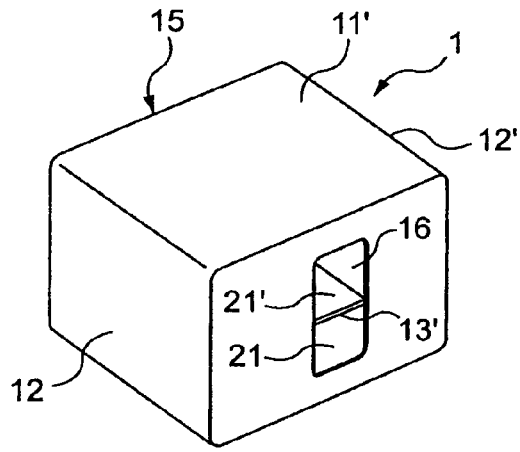
FIG. 2 shows, in perspective, another example of embodiment.
Figure 5:
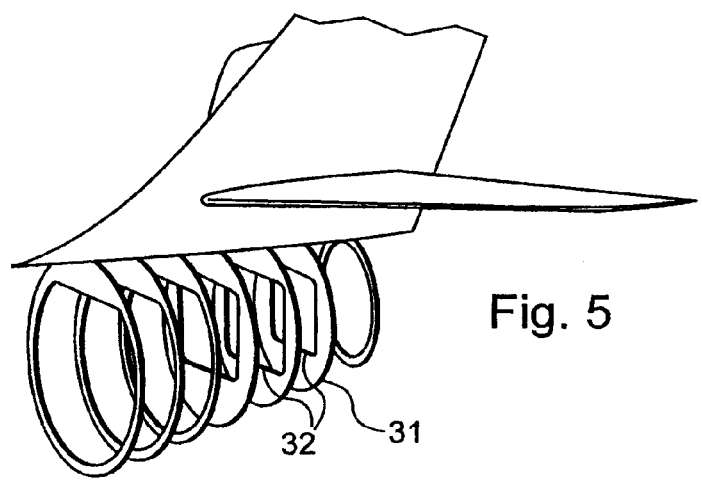
FIG. 5 is a perspective view, partially cut away, of the structure of the fuselage laid out to accommodate a module according to the invention.

Furthermore, as FIG. 2 shows, the transverse face opposite the transverse face 15 of the module 1 is equipped with an opening 16 that can be closed by a door (not illustrated), in order to provide access to the central aisle 23 and to the central cells 21 and 21' arranged on the two levels, this opening 16 making it possible to have an aisle running through when the horizontal partition 13' is folded away.

Such a module 1 makes it possible to lay out six berths economically in a limited space and advantageously can be arranged in a pressurized space 4 communicating with a passenger cabin 50 of an aircraft and positioned, for example, in the extension of the latter, inside a rear cone 30 of the fuselage 3 of the aircraft, in the manner illustrated on FIGS. 3 and 4.

This pressurized space 4 comprises, for example, a unit 40 next to the bedding module 1 and in which various service and bathroom areas can be arranged, on both sides of a central aisle 41 leading to a passage 42 having the same width as the module 1, in order to provide access to the various cells 2.

The floor 51 of the service unit 4 preferably is in the extension of an upper floor 5 of the aircraft forming the main deck on which the passenger cabin 50 is laid out. On the other hand, in the illustrated case of a module comprising six berths in two superposed rows, the limited height thereof makes it possible to position it on a slightly elevated floor 52 so as to follow more or less the lower profile 33 of the fuselage.

Moreover, because of its particularly simple form, this module can be prefabricated in the factory and inserted, at the time of assembly of the aircraft, in two or three successive frames 31 of the structure of the fuselage 3, in which openings 32 of rectangular conjugate shape are arranged.

This invention, however, is not limited to the details of the preferred embodiment that has just been described, the use of a standardized, and possibly prefabricated, bedding module making it possible to adapt the latter to different types of aircraft by varying the position thereof inside the fuselage, taking into consideration the internal configuration of the aircraft. A rest unit according to the invention also can have a bedding count other than six. The berths also can be arranged on three—or even four—levels.

The invention claimed is:

1. An aircraft fuselage rear cone, comprising:
   a rest unit, comprising:
      a plurality of cells of an elongated shape enclosed in the rest unit, each cell having longitudinal and transverse dimensions corresponding to a location of a berth, the cells being superposed on at least two levels and in at least two columns to form a parallelepipedal module of a substantially parallelepipedal outer shape, each of the cells being accessible via a transverse face of the parallelepipedal module; and
      a folding separation wall located between two cells superposed to each other, the separation wall folding upwards to form an aisle such that a crew member of an aircraft may walk from the transverse face to a rear face of the module, the rear face being located opposite of the transverse face, wherein
   each of the two cells separated by the folding wall include an opening at the rear face of the module for access to the aisle.

2. The rest unit according to claim 1, further comprising six cells arranged in three columns on two levels 3. The rest unit according to claim 2, wherein the folding separation wall separates superposed cells positioned in a middle column of the module.

4. The rear cone according to claim 1, comprising:
   a pressurized space accommodating the rest unit and communicating with a passenger cabin; and
   a unit located next to the rest unit and configured to accommodate a service area or a bathroom.

5. An aircraft, comprising the rear cone according to claim 1 or claim 4.

6. The rest unit according to claim 1, wherein the cells are arranged on three or four levels.

7. The rest unit according to claim 1, wherein the folding separation wall is pivotably mounted on a vertical side wall shared by each of the two cells superposed to each other.

8. The rest unit according to claim 1, wherein the folding separation wall separates the two superposed cells from each other when the wall is not folded.

* * * * *